United States Patent [19]
Hund

[11] Patent Number: 5,730,227
[45] Date of Patent: Mar. 24, 1998

[54] HITCHING DEVICE FOR ATTACHMENT TO A TRACTOR

[76] Inventor: George A. Hund, Rte. 1, Box 26, Paxico, Kans. 66526

[21] Appl. No.: 623,468

[22] Filed: Mar. 28, 1996

Related U.S. Application Data

[63] Continuation-in-part of Ser. No. 380,378, Jan. 30, 1995, abandoned.

[51] Int. Cl.⁶ .................................................. A01R 59/043
[52] U.S. Cl. .................. 172/439; 172/272; 172/448; 280/416.2
[58] Field of Search ..................... 37/901, 903; 172/7, 172/9, 272, 413, 417, 439, 445, 448, 662, 772–775, 776; 414/703, 920; 280/416.2

[56] References Cited

U.S. PATENT DOCUMENTS

| | | |
|---|---|---|
| 2,321,516 | 6/1943 | Robertson. |
| 2,531,768 | 11/1950 | Cline et al.. |
| 3,255,828 | 6/1966 | Abbott. |
| 3,716,253 | 2/1973 | Gniffke et al.. |
| 3,830,314 | 8/1974 | Aitkerhead ........................ 172/439 X |
| 4,502,706 | 3/1985 | Frambach, Sr.. |
| 5,029,650 | 7/1991 | Smit. |
| 5,169,279 | 12/1992 | Zimmerman ....................... 172/439 X |
| 5,193,623 | 3/1993 | Burette. |
| 5,232,055 | 8/1993 | Van Vuuren ........................ 172/445 X |

OTHER PUBLICATIONS

Pp. 22–28 of a John Deere Owner's Manual, published prior to Jan. 30, 1994.

*Primary Examiner*—Terry Lee Melius
*Assistant Examiner*—Robert Pezzuto
*Attorney, Agent, or Firm*—Litman, McMahon and Brown, L.L.C.

[57] ABSTRACT

A hitching device for attachment to a three-point hitch of a tractor has a frame removably coupled to and extending between the draft links of the three-point hitch. The frame has a horizontal member adapted to allow attachment of an implement. The horizontal member is disposed at a location that is below the draft links and that is forward of the ends of the draft links so that the horizontal member is closer to the tractor than the ends of the draft links. An alternative embodiment of hitching device includes an elevated hitch ball on top thereof for accommodating a fifth wheel trailer hitch. A pair of tine receiving slots are positioned in the two lowermost corners of the alternative hitching device frame for receiving a respective pair of rearwardly extending fork lift tines.

17 Claims, 4 Drawing Sheets

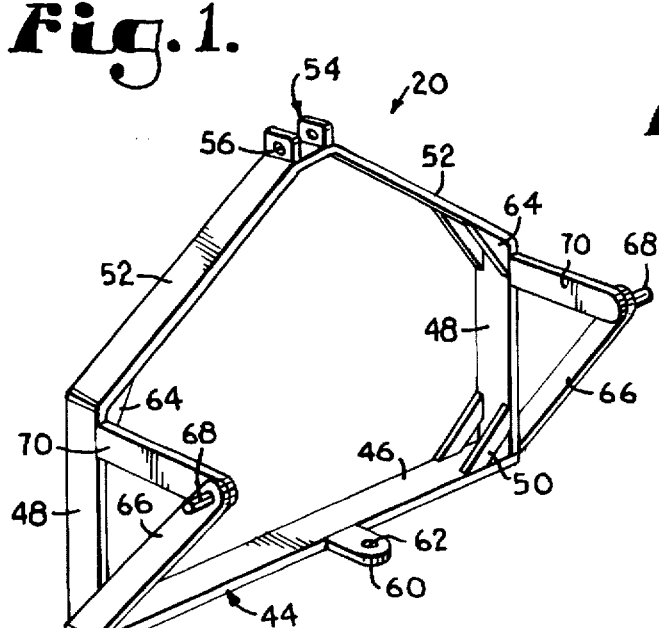
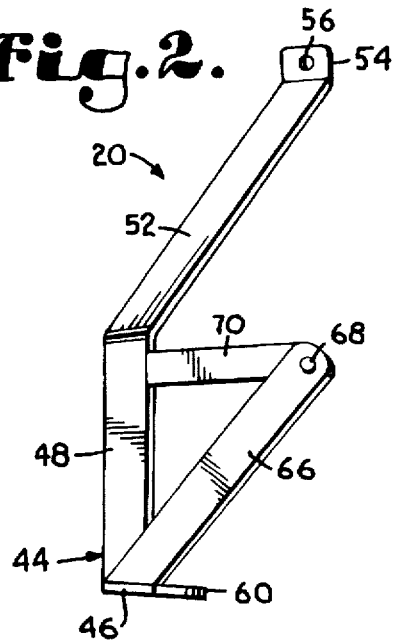
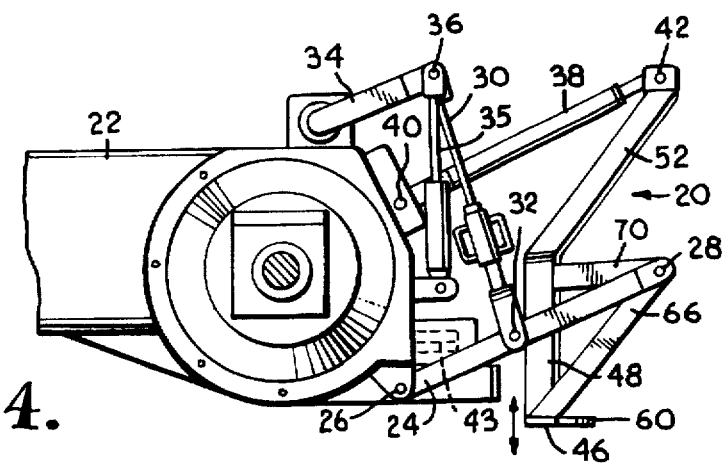
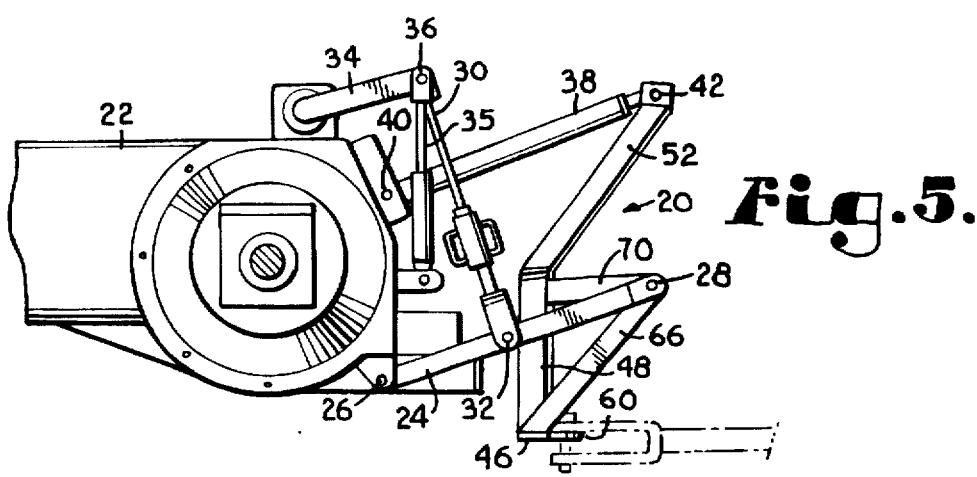

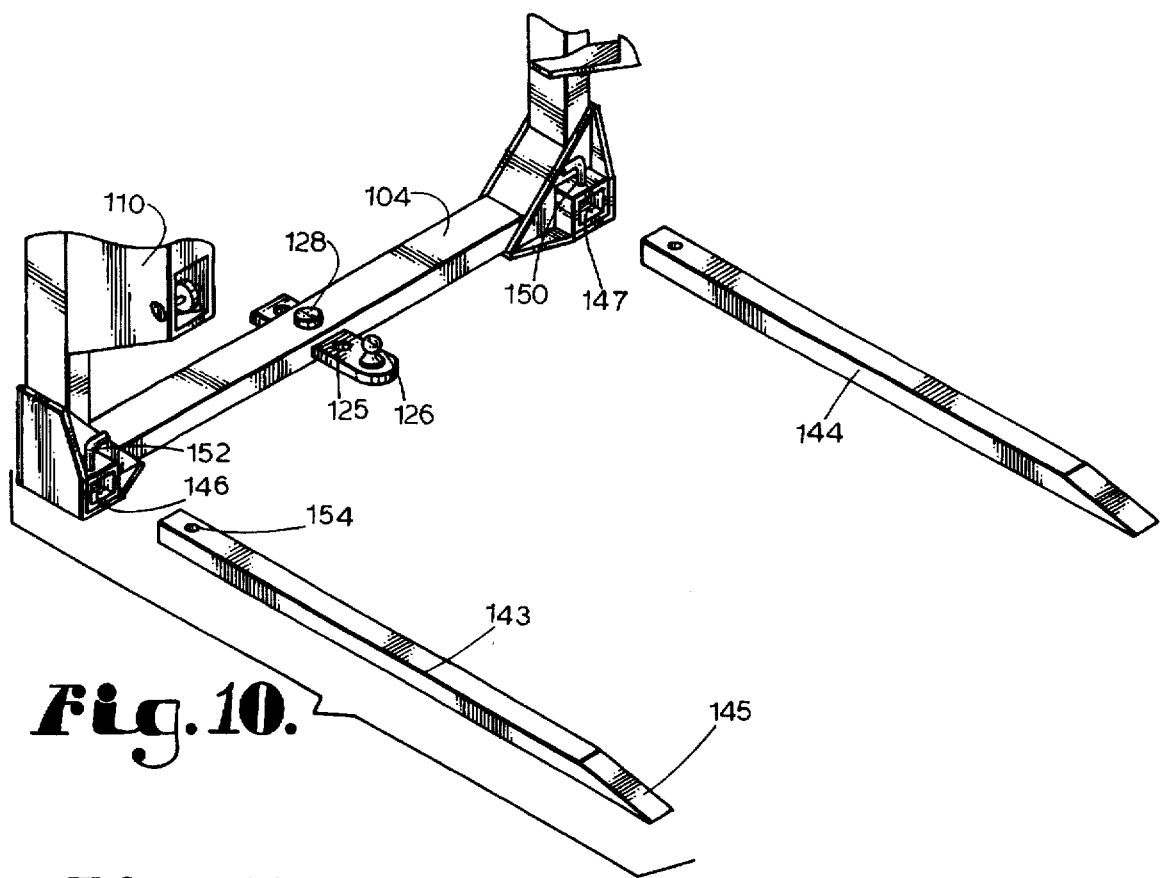
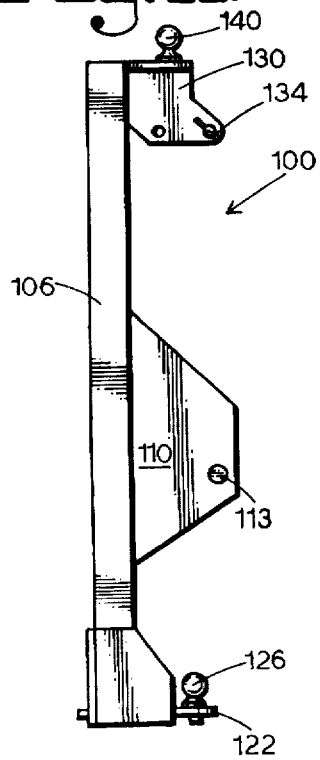
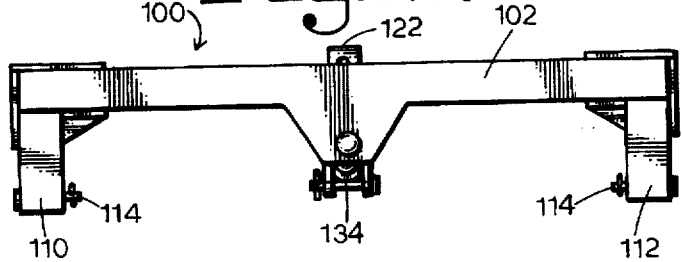

HITCHING DEVICE FOR ATTACHMENT TO A TRACTOR

CROSS REFERENCE TO RELATED APPLICATIONS

This application is a continuation-in-part of application Ser. No. 08/380,378 for HITCHING DEVICE FOR ATTACHMENT TO A TRACTOR, filed Jan. 30, 1995, now abandoned.

BACKGROUND OF THE INVENTION

This invention relates to a hitching device which is attached to the rearward end of a tractor and which is adjustable to allow for easy attachment of an implement.

A typical tractor has a drawbar extending rearwardly from the back of the tractor. The drawbar is normally fixed at a particular height. The distance the drawbar extends beyond the back of the tractor is adjustable by a pin arrangement located on the bottom of the tractor chassis. A hitching aperture is formed adjacent the rearward end of the drawbar.

In order to hitch an implement to a tractor, the tractor operator first adjusts the height of the implement so that the implement hitch approximates the height of the drawbar. The height of the hitch is typically adjusted by utilizing a hand-cranked jack. After the operator adjusts the hitch's height to the correct level, the operator then backs the tractor while aligning the rearward end of the drawbar with a clevis located on the forward end of the implement hitch. The hitching aperture is aligned with apertures formed in the implement clevis. A pin is positioned in the aligned apertures to effectuate a connection between the implement and the tractor.

As is apparent, the hitching operation with a fixed height drawbar requires the operator to climb down from the operating platform of the tractor in order to adjust the height of the implement hitch. After the implement hitch has been adjusted, the operator must then climb back up onto the platform and align the drawbar with the implement hitch. If the operator does not adjust the implement hitch height correctly the first time, then he/she may be required to climb off of and back onto the tractor several times in order to perform the hitching operation.

In addition to a drawbar, many tractors have a three-point hitch. The three-point hitch includes a pair of draft links pivotally attached to the tractor chassis. The draft links are spaced apart and disposed at generally the same adjustable vertical height. Each of the draft links is further connected to a lift link along an intermediate portion of the draft link. Each of the lift links is attached to a laterally-disposed hydraulically-actuated rockshaft. As the shaft is actuated upwardly or downwardly, the draft links are also pivoted upwardly or downwardly via the lift links.

The three-point hitch further includes a center link pivotally connected to the tractor chassis at a location above and directly between the draft links. The center link has a connecting hole or hook formed on its rearward end. The connecting holes of the draft links and the center link are aligned with and connected to a corresponding three-point hitch structure located on an implement. After an implement has been attached to the three-point hitch of the tractor, the implement can be raised or lowered by actuating the rockshaft.

A prior art device is available for adapting the three-point hitch for attachment to an implement having a standard hitch with a clevis. This device is called a hitch bar and consists of an elongated bar with pin members extending from each end. The pin members engage the connecting holes in the ends of the draft links so that the elongated bar is supported in a horizontal orientation. The elongated bar has a plurality of hitching apertures along its length to allow adjustable connection of the implement clevis. The operator can adjust the height of the hitch bar by actuating the rockshaft of the three-point hitch.

The use of a hitch bar is disadvantageous for various reasons. First, because the hitch bar is only attached at its ends to each draft link at only one point, the bar can rotate on its longitudinal axis in its horizontally suspended position between the draft links. Incidental rotation of the bar may result in the hitching apertures of the bar not being properly aligned for attachment to the hitch of an implement. Thus, the operator may be required to rotate the bar to its proper position during the connecting operation. Further, the bar may rotate as the tractor pulls an implement attached to the bar. This can result in unwanted stresses and breakage or excessive wear in the bar, connecting pin, and implement hitch clevis.

A further disadvantage of the hitch bar is that it moves the connection of the implement to the tractor farther away from the tractor than is typical with a standard drawbar. Because of the nature of the three-point hitch, the connecting holes disposed on the ends of the draft links are positioned a substantial distance behind the end of the drawbar adjusted to its standard length. Thus, the implement is disposed further behind the tractor than is typical. When using an implement that requires connection to the power takeoff (PTO) of the tractor (for example, a baler), attachment of the implement to the hitch bar may require the use of an extra long PTO shaft to supply power to the implement. Increasing the length of the PTO shaft increases the possibility of damage to the shaft and the surrounding structures. Further, oftentimes an operator using a hitch bar with a PTO driven implement inadvertently raises the hitch bar such that it contacts the PTO shaft causing damage thereto.

It is further known within the farming industry that positioning the hitch point of the implement to the tractor at a location that is the center of the PTO shaft is advantageous. This hitching configuration results in a substantially constant driving velocity being conveyed from the tractor through the PTO shaft to the implement even during turning of the tractor. Oftentimes, implements are constructed to provide this configuration with a drawbar adjusted to its standard length. Thus, the extended rearward position of the hitch bar does not allow this advantageous configuration. This can result in velocity fluctuations of the driven mechanisms of the implement.

In addition, tractors are often pressed into service to pull fifth wheel (gooseneck) trailers in conditions where access by a truck is difficult or impossible. Typical hitch bars, however, have no way to elevate the hitch high enough to allow the attachment of a fifth wheel type trailer.

It is often advantageous to have a type of lifting device, such as a fork lift, adapted for attachment to a tractor three point hitch. Typically the connection of such a lifting device would necessitate the removal of any equipment already connected to the three point hitch prior to installation of the lifting device.

Thus, a hitching device is needed which can be attached to the three-point hitch of the tractor to allow adjustment of the vertical height of the hitching aperture from the operating platform of the tractor. Further, a hitching device is needed which is stably secured to the three-point hitch so as to prevent inadvertent rotation. Further, a hitching device is needed which allows connection of the implement to a drawbar disposed at its standard length so that it can be driven with a PTO shaft in a normal advantageous manner. The hitching device should allow free, unimpeded access to the PTO drive on the tractor. Further, a hitching device is needed which allows the connection of either a fifth wheel trailer or a standard trailer. Finally, a hitching device is needed which can serve double duty for both hitching and as a fork lift or round bale lift.

SUMMARY OF THE INVENTION

A hitching device for attachment to a three-point hitch of a tractor has a frame removably coupled to and extending between the draft links of the three-point hitch. The frame has a horizontal member adapted to allow attachment of an implement. The horizontal member is disposed at a location that is below the draft links and that is forward of the ends of the draft links so that the horizontal member is closer to the tractor than the ends of the draft links. The frame is open in the center to allow unimpeded access to the PTO drive on the tractor.

An alternative embodiment of hitching device includes a pair of draft link receiving members arrayed just inside of respective vertical frame members on either side of a generally rectangular frame with a center link receiving member positioned beneath a top frame member of the frame. An elevated hitch ball receiving bore extends through the top frame member for accommodating a fifth wheel trailer hitch while an adjustable drawbar extends through a slot in a bottom frame member. A pair of tine receiving slots are positioned in the two lowermost corners of the frame for receiving a respective pair of rearwardly extending fork lift tines.

OBJECTS AND ADVANTAGES OF THE INVENTION

Accordingly, it is a primary object of the present invention to provide a hitching device that is coupled to the three-point hitch of a tractor so that the height of the device can be adjusted for easy attachment to an implement.

An additional important object of this invention is to provide a hitching device which is securely attached to the three-point hitch so that a stable attachment is obtained between the implement and the hitching device.

A further important object of this invention is to provide a hitching device which allows attachment of an implement to a tractor through the tractor's three-point hitch at a location that is closer to the tractor than prior art devices. This attachment allows an advantageous spatial relationship between the PTO shaft and the hitch point so that an implement can be driven by the tractor at a substantially constant velocity during turning of the tractor. As a result of achieving the foregoing object, the length of the PTO shaft of the implement is also limited so that the possibility of damage to the shaft and surrounding structures is reduced.

A further important object of this invention is to provide a hitching device which allows attachment of a fifth wheel trailer to a tractor via the tractor's three-point hitch at a location that is closer to the tractor than prior art devices.

A further important object of this invention is to provide a hitching device which can double as a fork lift or a round bale lift and transport mechanism in addition to serving as a hitching device.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

These and other important aims and objectives of the present invention will be further described, or will become apparent form the following description and explanation of the drawings, wherein:

FIG. 1 is a top perspective view of a first embodiment of a hitching device embodying the principles of this invention.

FIG. 2 is a side elevational view of the hitching device shown in FIG. 1.

FIG. 4 is a detailed cross-sectional view generally along line 4—4 of FIG. 3 and showing the hitch device in an elevated position.

FIG. 5 is a view similar to FIG. 4, but showing the hitching device in a lowered position with the hitch of an implement and the hitch pin shown in phantom lines.

FIG. 10 is a fragmentary, perspective view of the lowermost portion of the hitching device of FIG. 9, with the fork lift members removed.

FIG. 11 is a side elevational view of the hitching device of FIG. 9.

FIG. 12 is a top plan view of the hitching device of FIG. 9.

DETAILED DESCRIPTION OF THE INVENTION

Figure 3:
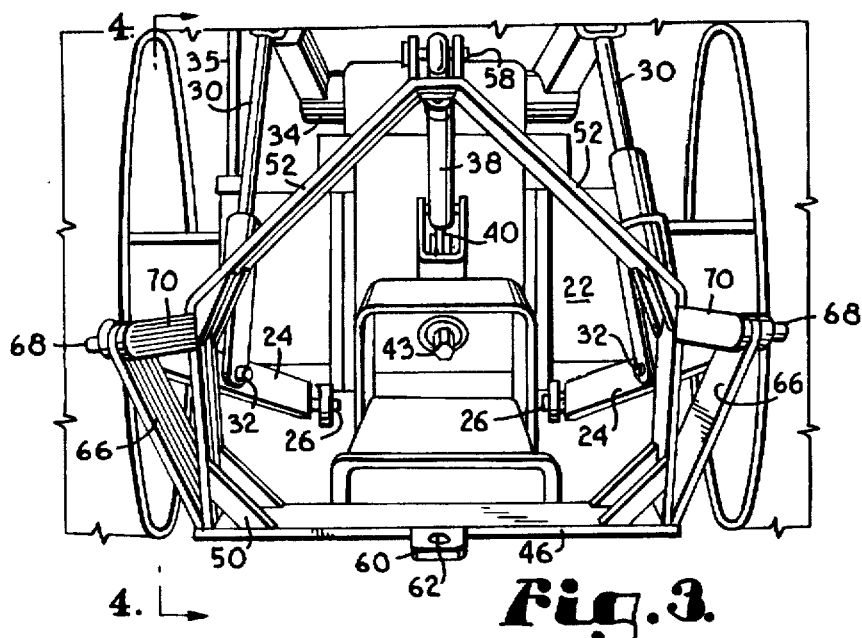
FIG. 3 is a rear perspective view of the hitching device shown in FIG. 1 attached to the three-point hitch structure located on the back of a tractor.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

First Embodiment of Hitching Device

A first embodiment of a hitching device embodying the principles of this invention is broadly designated in the drawing FIGS. 1–8 by the reference numeral 20. Device 20 is shown attached to a three-point hitch disposed on the rearward end of a chassis 22 of a tractor as shown in FIGS. 3O5. The three-point hitch of the tractor includes a pair of draft links 24 which are each pivotally secured on one end to chassis 22 of the tractor at pivot point 26. The rearward end of each link 24 has a laterally disposed attaching hole 20 formed therein. Each of links 24 is attached at an intermediate location to a lift link 30 by a pin arrangement 32. The upper end of each lift link 30 is attached to a generally U-shaped rockshaft 34 by a pin arrangement 36. Rockshaft 34 is capable of being rotated upwardly and downwardly by a suitable hydraulic actuator 35. As rockshaft 34 is rotated upwardly, draft links 24 are pivoted upwardly via lift links 30. As rockshaft 34 is rotated downwardly, draft links 24 are pivoted downwardly via lift links 30.

The three-point hitch of the tractor further includes a center link 38 pivotally attached to tractor chassis 22 at pivot point 40. Center link 38 has an attaching hole 42 formed on its rearward end. Instead of having hole 42 formed on its end, center link 38 can also have a hook formed thereon with a locking structure to secure a pin-like member within the hook.

Device 20 has a frame 44 extending between draft links 24, as best shown in FIGS. 103. Frame 44 has a generally horizontal plate 46 and a pair of vertical plates 48. Plates 48 extend upwardly from opposite ends of horizontal plate 46. Plates 48 are supported in their vertical orientation by braces 50.

Each of plates 48 has a center link connecting plate 52 extending from its upper edge. Connecting plates 52 are angled inwardly toward one another and are connected together to form an upwardly opening clevis 54. Clevis 54 is laterally positioned at the midpoint of horizontal plate 46. Each of the clevis arms has a connecting aperture 56. A pin 58 is received in connecting holes 56, as best shown in FIG. 3. Clevis 54, holes 56 and pin 58 are used to connect device 20 to center link 38. More particularly, hole 42 of link 38 is aligned with holes 56 and pin 58 is inserted into the aligned holes. Further, if link 38 has a hook disposed on its end, link 38 can be pivoted downwardly until the open portion of the hook engages pin 58 disposed in holes 56.

A tongue 60 extends rearwardly from horizontal plate 46. Tongue 60 has a hitch aperture 62 formed therein and for connection to the clevis of an implement. Braces 64 are attached to plates 48 and plates 52 to support plates 52 in their inwardly extending orientation.

A pair of draft link connecting plates 66 are attached to an extend upwardly and rearwardly from horizontal plate 46. Plates 66 are disposed on opposite ends of plate 46. Each plate 66 is also connected to the lower portion of its corresponding vertical plate 48. Each plate 66 has a pin member 68 extending orthogonal to and outwardly from its rearward end. Pin members 68 engage respective attaching holes 28 of draft links 24 to secure device 20 to the draft links. A key (not shown) can be used to secure each of the pin members within its respective attaching hole.

Each plate 66 has a brace 70 extending toward and attached to the upper portion of the corresponding vertical plate 48. Braces 70 serve to support connecting plate 66 in their angled position.

When device 20 is attached to a tractor as shown in FIGS. 3–5, tongue 66 is disposed at a location that is below draft links 24. Further, the position of tongue 60 is closer to the tractor than the rearward ends of draft links 24 with the attaching holes 28 disposed thereon. This location of tongue 60 with hitch aperture 62 therein is substantially the location that a drawbar would be in when the drawbar is adjusted to its standard length. Further, the attachment of device 20 to the three-point hitch of the tractor by pin members 68 and pin 58 prevents rotation of tongue 60 with respect to draft links 24.

In order to adjust the height of tongue 60 during the hitching of an implement, the operator simply actuates the three-point hitch to move the draft links, and the device 20 attached thereto upwardly or downwardly. The tongue is shown in an elevated position in FIG. 4 and in a lowered position in FIG. 5. Because of the attachment of device 20 to both of the draft links and to the center link, the tongue will be maintained at an orientation that is substantially parallel to the ground whether the device is elevated or lowered.

Because tongue 60 is disposed the same distance from the tractor as is a typical drawbar adjusted to its standard length, a PTO-driven implement specifically designed for a drawbar having a standard length maintains its constant velocity characteristics. That is, numerous implements are designed so that with a drawbar having a standard length, the hitch point between the draw bar and the implement is approximately at the midpoint of the PTO shaft extending from the implement. This design characteristic allows for transfer of constant velocity power from the tractor to the implement even during turning. Additionally, the close-in positioning of the tongue limits the need for using an excessively long PTO shaft which is more likely to be damaged or damage surrounding structures. Because the tongue is disposed a distance below draft links 24 as opposed to at the same level as the draft links, the tongue is less likely to interfere with or contact a PTO shaft extending from an implement to the PTO hub 43 located on tractor chassis 22 even if the tongue is inadvertently raised by the operator.

The device 72 can be easily fabricated by welding the plates and braces comprising the structure together at their connection locations.

Figure 7:
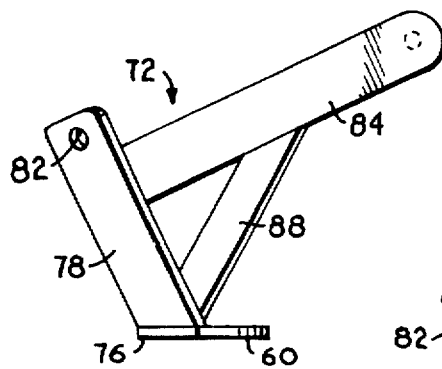
FIG. 7 is a side elevational view of the hitching device shown in FIG. 6.
Figure 6:
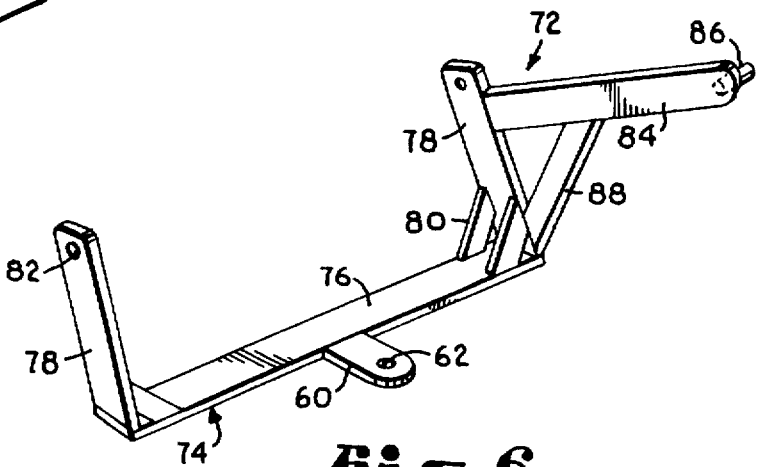
FIG. 6 is a top perspective view of a second embodiment of the present invention.
Figure 8:
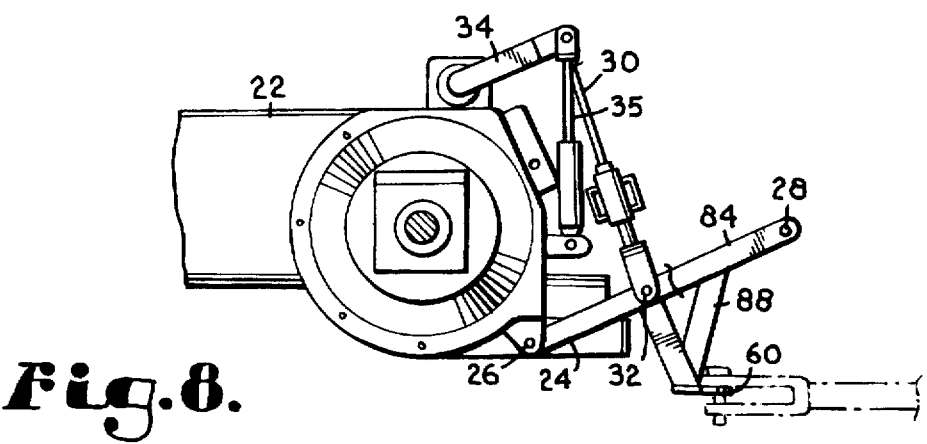
FIG. 8 is a view similar to FIG. 5 but showing the hitching devise shown in FIG. 6 attached to the three-point hitch of the tractor, parts being broken away to reveal details of construction.
Figure 9:
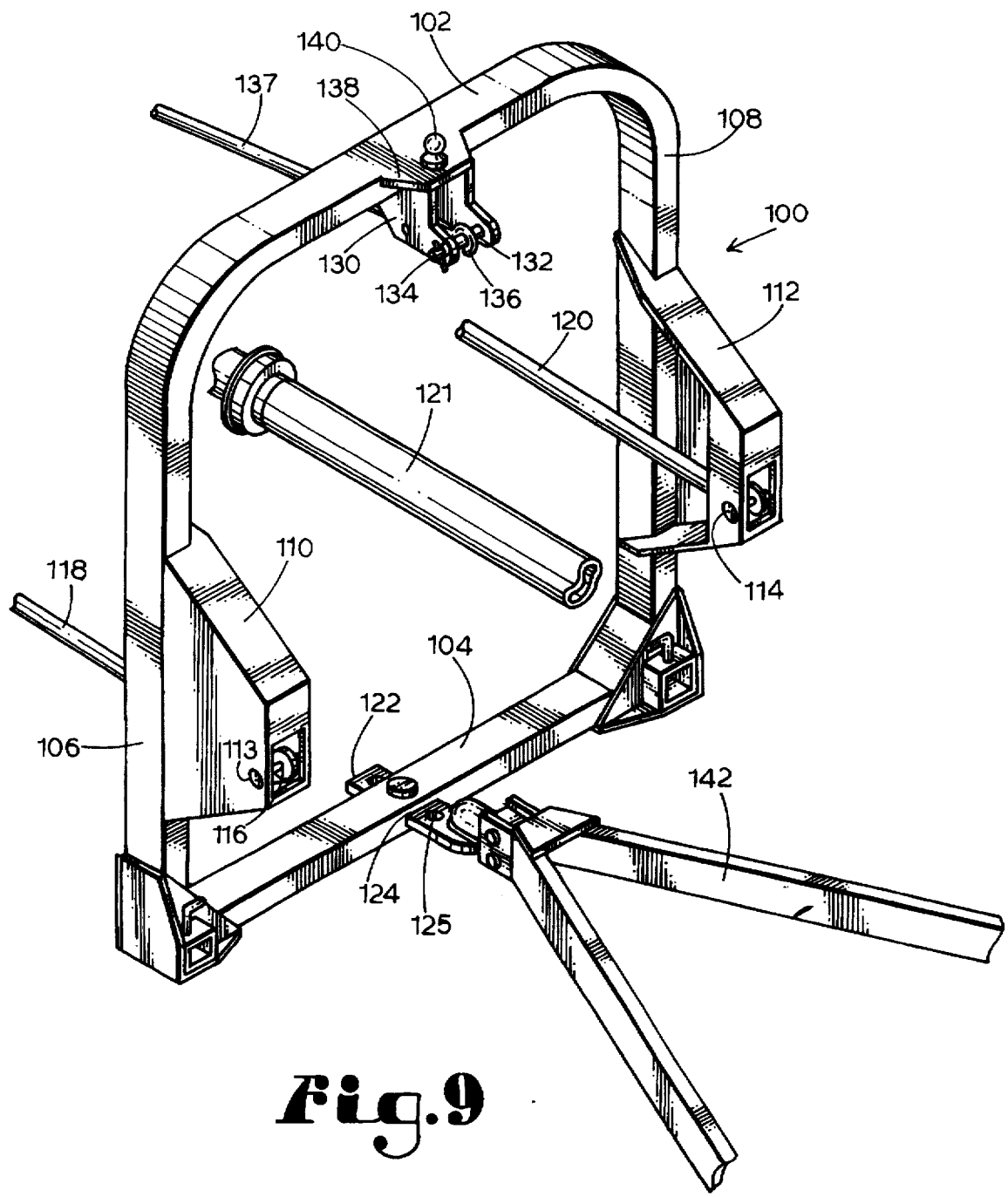
FIG. 9 is a perspective view of an alternative embodiment of hitching device equipped with a fifth wheel (gooseneck) trailer hitch, a conventional trailer hitch on an adjustable drawbar, and a pair of removably attached fork lift members.

A second embodiment of this invention is shown in FIGS. 6–8 and broadly designated by the reference numeral 72. In the description of hitching device 72, parts similar to those of hitching device 20 are indicated with like reference numerals. Device 72 has a frame 74 which extends between draft links 24. Frame 74 has a generally horizontal plate 76 and a pair of upwardly extending plates 78. Plates 78 extend upwardly and slightly forwardly from opposite ends of plate 76. Plates 78 are supported in their upward orientation by braces 80. Horizontal plate 76 has a tongue 60 with a hitch aperture 62.

Each of plates 78 has a connecting hole 82 formed adjacent its upper end. Holes 82 are used to connect frame 74 to the draft links. More particularly, each hole 82 receives the pin of one of pin arrangements 32. Arrangements 32 are used to attach lift links 30 to draft links 24. Thus, plates 78 are attached to draft links 24 at the locations where the lift links are attached to the draft links. Plates 78 can be held on the pins of pin arrangements 32 by a key (not shown).

A connecting plate 84 is attached to and extends rearwardly from one of plates 78. Plate 84 has pin member 86 extending outwardly and orthogonal to its rearward end. Pin member 86 is for engagement with the attaching hole 28 of one of draft links 24. Pin member 86 can be held in attaching hole 28 by a key (not shown). A brace 88 is used to support plate 84 in its rearwardly extending orientation. Brace 88 extends generally from the midpoint of plate 84 to the lower end of plate 78.

Device 72 is securely attached to the three-point hitch at pin arrangements 32 and at the attaching hole 28 of one of draft links 24. The attachment plate 84 to hole 28 of draft link 24 through pin member 86 ensures that frame 74, and thus tongue 60, does not pivot with respect to the draft links. Device 72 is not connected to the center link of the three-point hitch. Thus, the center link can be located in a storage position or completely removed from the tractor as shown in FIG. 8.

As with device 20 described above, the height of tongue 60 of device 72 is adjustable by manipulating the three-point hitch from the operator's platform of the tractor. Also, the tongue is disposed at a position that is below the draft links and that is closer to the tractor than the ends of the draft links. The tongue is positioned generally at the location where the drawbar of the tractor would be positioned when it is adjusted for its standard length. Therefore, device 72 has the earlier described advantages of device 20.

The device 20 can be easily fabricated by welding the plates and braces comprising the structure together at their connection locations.

Second Embodiment of Hitching Device

Referring to FIGS. 9–12, a second embodiment of a hitching device is generally indicated at 100. The hitching device 100 includes a generally rectangular, open frame including a top frame member 102, a bottom frame member 104, and left and right vertical side frame members 106 and 108, respectively. A pair of generally trapezoidally shaped draw link receiving frames 110 and 112 are attached to the rear of the side frame members 106 and 108, respectively. Each of the draw link receiving frames 110 and 112 includes a transversely extending bore 113 for accommodating a pin 114. Each pin 114 is adapted to extend through a respective terminating eyelet 116 in draw links 118 and 120. The hitching device 100 thus is supported by the draw links 118 and 120 in a position forward from the terminating eyelets 116 of the draw links 118 and 120 such that a hitch draw bar 122 can be positioned in a normal towing position, as described above with reference to FIGS. 1–8. The placement of the draw link receiving frames 110 and 112 in a position inside of the vertical side frame members 106 and 108, respectively, allows the raising and lowering of, as well as limited side to side movement of the inventive hitching device 100 without interference between the draw links 118 and 120 and the side frame members 106 and 108. Furthermore, the large open space in the middle of the hitching device 100 allows free access to the PTO drive of a tractor (not shown) for convenient connection of a PTO shaft, such as the shaft 121.

The draw bar 122 extends through a slot 124 in the bottom frame member 104 and includes a number of vertically oriented bores 125 therethrough for accepting hitch balls such as the ball 126, and a positioning pin 128. The draw bar 122 is thus adjustable fore and aft relative to the hitching device 100.

Attached beneath the top frame member 102 is a center link receiving frame 130 which includes a horizontally extending bore 132 for accommodating a pin 134. The pin 134 is adapted for insertion through a terminating eyelet 136 in a center link 137 to allow the top of the hitching device 100 to be supported thereby. The frame 130 has a top plate 138 with a vertical bore therethrough for accommodating a hitch ball 140. The hitch ball 140 is thus positioned at an appropriate (adjustable) height to accommodate a hitch from a fifth wheel trailer (not shown). The hitching device 100 can thus be used to tow conventional trailers, such as a trailer 142, a tongue of which is shown broken away in FIG. 10, or a fifth wheel trailer.

An added feature of the alterative hitching device 100 is the provision of a pair of removable fork lift tines 143 and 144. The tines 143 and 144 are preferably made of lengths of rectangular steel tubing with tapered ends 145. A respective pair of tine receiving receptacles 146 and 147 are positioned in respective lowermost corners of the hitching device 100. Each tine receiving receptacle 146 and 147 comprises a length of rectangular tubing with a vertically oriented bore 150 extending therethrough to accommodate a pin 152. Each tine 143 and 144 has a matching through bore 154 for receiving the corresponding latch pin 152 therein. The tines 143 and 144 are insertable in the respective receptacles 146 and 147 where they are locked in place via the pins 152. Since the bottom frame member 104, once the tractor rockshaft is lowered to its lowermost position, is placed at ground level, the tines 143 and 144 can be used in a manner similar to a fork lift. The hitching device 100 thus doubles as a fork lift or round bale lift and transport device. Furthermore, this ground level position of the bottom frame member 104 allows the hitching of trailers without requiring lifting of jacking of the trailer tongue.

It is to be understood that while certain forms of the present invention have been illustrated and described herein, it is not to be limited to the specific forms or arrangement of parts described and shown.

What is claimed and desired to be secured by Letters Patent is as follows:

1. A hitching device for attachment to a three-point hitch of a tractor, the three point hitch including a center link positioned above and between a pair of draft links, the center link and each draft link including an attachment bore therein proximate a respective end which is distal from the tractor, said draft links being pivotable such that said distal ends are movable between a lowermost and an uppermost position, the hitching device comprising:

(a) a frame adapted to be removably coupled to the three-point hitch, said frame including top and bottom frame members connected by a pair of side frame members, said bottom frame member including hitching means for allowing the attachment of an implement; and (b) a pair of draft link receiving frames, each said receiving frame being attached to a respective side frame member and extending rearwardly from the respective side frame member, each said link receiving frame being removably attachable to the attachment bore of a respective one of the draft links in a position such that the respective draft link is positioned inside of the respective side frame member, the position of said link receiving frames and the length of said side frame members being such that, when said draft link receiving frames are attached to the respective draft links, said bottom frame member is disposed at a location that is substantially below the draft links and that is forward of the distal ends of the draft links such that the bottom frame member is closer to the tractor than the bores near the distal ends of the draft links and such that said bottom frame member rests at ground level when said draft links of said three point hitch are lowered to said lowermost position.

2. A hitching device as in claim 1 wherein said bottom frame member comprises:

(a) a horizontally oriented slot accommodating a hitch tongue;

(b) a vertically oriented through bore extending through said slot, and wherein (c) said hitch tongue has a plurality of vertically oriented through bores extending along the length thereof to allow fore and aft adjustment of said hitch bar within said slot.

3. A hitching device as in claim 1 and further comprising:

(a) a center link receiving frame attached to and positioned below and extending rearward from said top frame member, said center link receiving frame being removably attachable to the attachment bore near the distal end of said center link with said center link attachment bore being positioned rearward from said top frame member.

4. A hitching device as in claim 3, said center link receiving frame further comprising:

(a) a top plate; and (b) a through bore extending through said top plate in a position to accommodate a hitch ball, the positions of said draft link receiving frames and said center link receiving frame and the length of said side frame members being such that hitch ball is positioned to accommodates a hitch of a fifth wheel trailer.

5. A hitching device as in claim 1 and further comprising:

(a) a tine receiving receptacle positioned proximate said bottom frame member; and (b) a lift tine with a rear portion sized to fit within said receptacle such that said lift tine is attached to and extends rearwardly from said hitching device frame.

6. A hitching device as in claim 5, wherein there are two of said tine receiving receptacles and two of said lift tines such that said hitching device, in combination with said three point hitch, can serve as a fork lift.

7. A hitching device as in claim 3, wherein:

(a) said top and bottom frame members are separated from each other by a first predetermined distance and said side frame members are separated from each other by a second predetermined distance such that an opening is formed in said frame; and (b) said draft link receiving frames are positioned on said side frame members such that, when said draft link receiving frames are attached to the respective draft links and said center link receiving frame is attached to the center link, a drive/shaft can be connected between a vehicle attached to said hitching device and a PTO of the tractor through said opening in said frame without interference regardless of the position of said draft links and regardless of whether the tractor and any towed vehicle are aligned or are turning.

8. A hitching device for attachment to a three-point hitch of a tractor, the three point hitch including a center link positioned above and between a pair of draft links, the center link and each draft link including an attachment bore therein proximate a respective end which is distal from the tractor, said draft links being pivotable such that said distal ends are movable between a lowermost and an uppermost position, the hitching device comprising:

(a) a frame adapted to be removably coupled to the three-point hitch, said frame including top and bottom frame members connected by a pair of side frame members, said bottom frame member including hitching means for allowing the attachment of an implement;

(b) a pair of draft link receiving frames, each said receiving frame being attached to a respective side frame member and extending rearwardly from the respective side frame member, each said link receiving frame being removably attachable to the attachment bore of a respective one of the draft links in a position such that the respective draft link is positioned inside of the respective side frame member, the position of said link receiving frames and the length of said side frame members being such that, when said draft link receiving frames are attached to the respective draft links, said bottom frame member is disposed at a location that is below substantially the draft links and that is between the tractor and the distal ends of the draft links such that the bottom frame member is closer to the tractor than the attachment bores of the draft links and such that said bottom frame member rests at ground level when said draft links of said three point hitch are lowered to said lowermost position;

(c) a center link receiving frame attached to and positioned below and extending rearwardly from said top frame member, said center link receiving frame being removably attachable to the attachment bore of said center link with said center link attachment bore being positioned rearward from said top frame member; said center link receiving frame further comprising:

(i) a top plate; and (ii) a through bore extending through said top plate in a position to accommodate a hitch ball; and wherein (d) the positions of said draft link receiving frames and said center link receiving frame and the length of said side frame members are such that hitch ball is positioned to accommodate a hitch of a fifth wheel trailer.

9. A hitching device as in claim 8 wherein said bottom frame member comprises:

(a) a horizontally oriented slot accommodating a hitch tongue;

(b) a vertically oriented through bore extending through said slot, and wherein (c) said hitch tongue has a plurality of vertically oriented through bores extending along the length thereof to allow fore and aft adjustment of said hitch bar within said slot.

10. A hitching device as in claim 8 and further comprising:

(a) a tine receiving receptacle positioned proximate said bottom frame member; and (b) a lift tine with a rear portion sized to fit within said receptacle such that said lift tine is attached to and extends rearwardly from said hitching device frame.

11. A hitching device as in claim 10, wherein there are two of said tine receiving receptacles and two of said lift tines such that said hitching device, in combination with said three point hitch, can serve as a fork lift.

12. A hitching device as in claim 8, wherein:

(a) said top and bottom frame members are separated from each other by a first predetermined distance and said side frame members are separated from each other by a second predetermined distance such that an opening is formed in said frame; and (b) said draft link receiving frames are positioned on said side frame members such that, when said draft link receiving frames are attached to the respective draft links and said center link receiving frame is attached to the center link, a drive shaft can be connected between a vehicle attached to said hitching device and a PTO of the tractor through said opening in said frame without interference regardless of the position of said draft links and regardless of whether the tractor and any towed vehicle are aligned or are turning.

13. A hitching device for attachment to a three-point hitch of a tractor, the three point hitch including a center link positioned above and between a pair of draft links, the center link and each draft link including an attachment bore therein proximate a respective end which is distal from the tractor, said draft links being pivotable such that said distal ends are movable between a lowermost and an uppermost position, the hitching device comprising:

(a) a frame adapted to be removably coupled to the three-point hitch, said frame including top and bottom frame members connected by a pair of side frame members, said bottom frame member including hitching means for allowing the attachment of an implement;

(b) a pair of draft link receiving frames, each said receiving frame being attached to a respective side frame member and extending rearwardly from the respective side frame member, each said link receiving frame being removably attachable to the attachment bore of a respective one of the draft links in a position such that the respective draft link is positioned inside of the respective side frame member, the position of said link receiving frames and the length of said side frame members being such that, when said draft link receiving frames are attached to the respective draft links, said bottom frame member is disposed at a location that is substantially below the draft links and that is between the tractor and the distal ends of the draft links such that the bottom frame member is closer to the tractor than the attachment bores of the draft links and such that said bottom frame member rests at ground level when said draft links of said three point hitch are lowered to said lowermost position;

(c) a pair of tine receiving receptacles positioned proximate said bottom frame member near respective side frame members; and (d) a pair of lift tines, each with a rear portion sized to fit within said receptacle such that said lift tines are attachable to and extend rearwardly from said hitching device frame.

14. A hitching device as in claim 13 wherein said bottom frame member comprises:

(a) a horizontally oriented slot accommodating a hitch tongue;

(b) a vertically oriented through bore extending through said slot, and wherein (c) said hitch tongue has a plurality of vertically oriented through bores extending along the length thereof to allow fore and aft adjustment of said hitch bar within said slot.

15. A hitching device as in claim 13 and further comprising:

(a) a center link receiving frame attached to and positioned below and extending rearward from said top frame member, said center link receiving frame being removably attachable to the attachment bore near the distal end of said center link with said center link attachment bore being positioned rearward from said top frame member.

16. A hitching device as in claim 15, said center link receiving frame further comprising:

(a) a top plate; and (b) a through bore extending through said top plate in a position to accommodate a hitch ball, the positions of said draft link receiving frames and said center link receiving frame and the length of said side frame members being such that hitch ball is positioned to accommodate a hitch of a fifth wheel trailer.

17. A hitching device as in claim 15, wherein:

(a) said top and bottom frame members are separated from each other by a first predetermined distance and said side frame members are separated from each other by a second predetermined distance such that an opening is formed in said frame; and (b) said draft link receiving frames are positioned on said side frame members such that, when said draft link receiving frames are attached to the respective draft links and said center link receiving frame is attached to the center link, a drive shaft can be connected between a vehicle attached to said hitching device and a PTO of the tractor through said opening in said frame without interference regardless of the position of said draft links and regardless of whether the tractor and any towed vehicle are aligned or are turning.

* * * * *